(12) United States Patent
Gounares

(10) Patent No.: US 11,461,481 B1
(45) Date of Patent: Oct. 4, 2022

(54) ENCRYPTED TO BE EXECUTED SOFTWARE CODE AND EXECUTION ENVIRONMENT APPARATUSES, SYSTEMS, AND METHODS

(71) Applicant: POLYVERSE CORPORATION, Bellevue, WA (US)

(72) Inventor: Alexander Gounares, Kirkland, WA (US)

(73) Assignee: Polyverse Corporation, Bellevue, WA (US)

( * ) Notice: Subject to any disclaimer, the term of this patent is extended or adjusted under 35 U.S.C. 154(b) by 0 days.

(21) Appl. No.: 17/831,873

(22) Filed: Jun. 3, 2022

Related U.S. Application Data

(60) Provisional application No. 63/197,206, filed on Jun. 4, 2021.

(51) Int. Cl.
*G06F 21/60* (2013.01)
*G06F 21/57* (2013.01)
*H04L 9/14* (2006.01)
*G06F 21/14* (2013.01)

(52) U.S. Cl.
CPC ............ *G06F 21/602* (2013.01); *G06F 21/14* (2013.01); *G06F 21/57* (2013.01); *H04L 9/14* (2013.01)

(58) Field of Classification Search
CPC ........ G06F 21/602; G06F 21/14; G06F 21/57; H04L 9/14
See application file for complete search history.

(56) References Cited

U.S. PATENT DOCUMENTS

| | | |
|---|---|---|
| 8,014,308 B2 | 9/2011 | Gates, III et al. |
| 8,312,273 B2 | 11/2012 | Nice et al. |
| 8,595,743 B2 | 11/2013 | Gounares et al. |
| 8,650,538 B2 | 2/2014 | Gounares |
| 8,656,135 B2 | 2/2014 | Gounares et al. |
| 8,656,378 B2 | 2/2014 | Gounares et al. |
| 8,694,574 B2 | 4/2014 | Gounares et al. |
| 8,775,437 B2 | 7/2014 | Weitz et al. |
| 8,849,968 B2 | 9/2014 | Hunt et al. |
| 8,909,546 B2 | 12/2014 | Horvitz et al. |
| 8,966,462 B2 | 2/2015 | Gounares et al. |
| 8,978,016 B2 | 3/2015 | Gataullin et al. |
| 9,021,445 B2 | 4/2015 | Gataullin et al. |
| 9,141,502 B2 | 9/2015 | Havemose |
| 9,286,042 B2 | 3/2016 | Gounares et al. |
| 9,292,415 B2 | 3/2016 | Seto et al. |
| 9,389,992 B2 | 7/2016 | Gataullin et al. |
| 9,417,859 B2 | 8/2016 | Gounares et al. |
| 9,465,721 B2 | 10/2016 | Garrett et al. |

(Continued)

FOREIGN PATENT DOCUMENTS

EP 3907616 A1 * 11/2021 ............ G06F 11/302

*Primary Examiner* — Abiy Getachew
(74) *Attorney, Agent, or Firm* — AEON Law, PLLC; Adam L. K. Philip; Jonathan E. Olson

(57) ABSTRACT

Security enhancement herein primarily relate to digital code undergoing a first fortification protocol by which a digital package is prepared, a secure execution environment being configured for use with the package at or via a source facility, and at least some of the package being executed in in the secure execution environment at a destination facility. Such enhanced configurations may arrive to or from a remote facility, for example, without a concomitant loss of performance.

19 Claims, 8 Drawing Sheets

(56) References Cited

U.S. PATENT DOCUMENTS

| | | |
|---|---|---|
| 9,483,590 B2 | 11/2016 | Kishore et al. |
| 9,558,362 B2 | 1/2017 | Bedoya |
| 9,665,474 B2 | 5/2017 | Li et al. |
| 9,807,077 B2 | 10/2017 | Gounares |
| 9,923,793 B1 | 3/2018 | Gore et al. |
| 10,033,604 B2 | 7/2018 | Maes et al. |
| 10,050,797 B2 | 8/2018 | Garrett et al. |
| 10,127,160 B2 | 11/2018 | Gounares et al. |
| 10,142,453 B2 | 11/2018 | Shuttleworth et al. |
| 10,339,837 B1 | 7/2019 | Gounares et al. |
| 10,356,155 B2 | 7/2019 | Tiwari et al. |
| 10,360,150 B2 | 7/2019 | Karthikesan |
| 10,382,424 B2 | 8/2019 | Kroehling et al. |
| 10,416,979 B2 | 9/2019 | Scrivano et al. |
| 10,701,213 B2 | 6/2020 | Dyer et al. |
| 11,182,508 B1 | 11/2021 | Hanaoka et al. |
| 2014/0274078 A1 | 9/2014 | Hyde et al. |
| 2015/0094046 A1 | 4/2015 | Jung et al. |
| 2015/0379301 A1* | 12/2015 | Lesavich ............... G06F 16/951 726/28 |
| 2020/0403781 A1* | 12/2020 | Gentry ............... H04N 21/2353 |
| 2022/0078023 A1* | 3/2022 | Nicolas .................. H04L 9/008 |

\* cited by examiner

ENCRYPTED TO BE EXECUTED SOFTWARE CODE AND EXECUTION ENVIRONMENT APPARATUSES, SYSTEMS, AND METHODS

RELATED APPLICATIONS

This application relates to U.S. Prov. App. No. 63/197,206 ("Encrypted To Be Executed Software Code and Execution Environment Apparatus, System, and Method") incorporated by reference in its entirety.

FIELD

The present disclosure relates to a computing device, in particular to, a computing device to encrypt or obfuscate executable software code (or both) and to implement an execution environment for encrypted or obfuscated executable software code.

BACKGROUND

Computer code, even when binary, may be decompiled and viewed during runtime or execution. This contributes to issues such as unauthorized copying of information and data, reverse engineering of secret information and processes, and exposed computational surface area allows hackers and malicious parties to find and exploit bugs.

Homomorphic encryption is a form of encryption that performs computations or functions on encrypted data without first decrypting it. Homomorphic encryption yields output which may be encrypted and which, when decrypted, is identical to output which would have resulted from performance of the functions on unencrypted data. Homomorphic encryption can be characterized as partially homomorphic, which can support evaluation of circuits consisting of only one type of gate, e.g., addition or multiplication, somewhat homomorphic, which can evaluate two types of gates, but only for a subset of circuits, leveled fully homomorphic, which can evaluate arbitrary circuits composed of multiple types of gates of bounded or pre-determined depth, and fully homomorphic encryption, which can evaluate arbitrary circuits composed of multiple types of gates of unbounded depth.

The hope is that homomorphic encryption will allow sensitive data, such as health care data or financial transaction data, to be processed by a computer processor without producing an unencrypted or "plain text" result and without revealing the sensitive data while it is being processed. For example, a seller of a produce may process credit card information of a purchaser of the product in an encrypted format using homomorphic encryption, may transmit the encrypted result to a merchant services provider or bank, and the merchant services provider may respond indicating that funds have been transferred to the seller, with reduced concern that the purchaser's credit card information is revealed either on the seller's computer processor or in transit to the merchant services provider.

However, homomorphic encryption may be computationally expensive, for example, one million times slower than conventional unencrypted processing, or may not be compatible with existing compute infrastructure (or both).

Needed is a method, apparatus, or system to encrypt or obfuscate executable software code (or both) and to implement an execution environment (directly or otherwise) for encrypted or obfuscated (or both) executable software code, wherein the method, apparatus or system is faster than homomorphic encryption and provides many of the same benefits.

DETAILED DESCRIPTION

Figure 1:
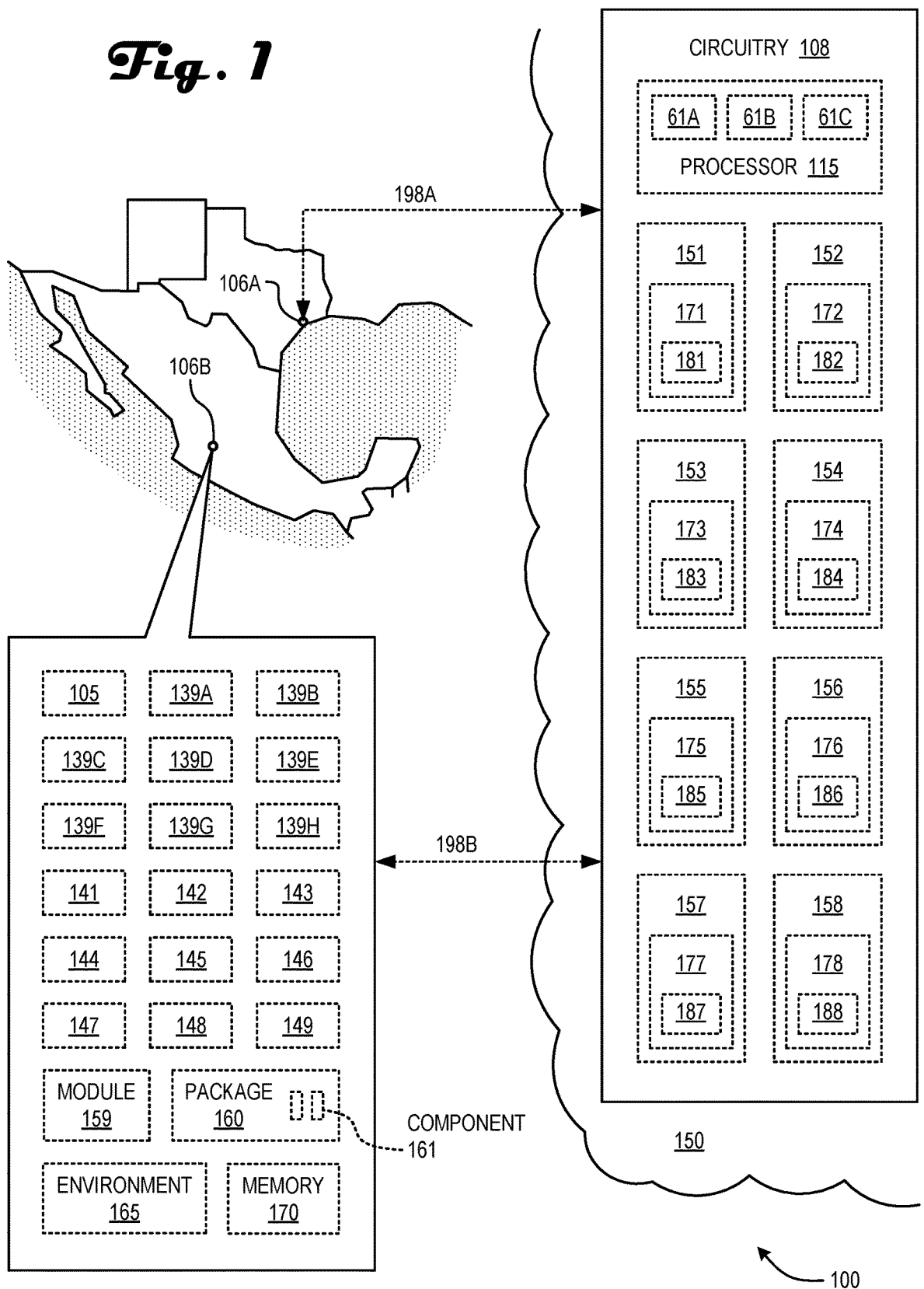
FIG. 1 depicts a system and context in which herein-described inventive components may be situated on either side of a national border in which one or more improved technologies may be incorporated.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. "Above," "after," "any," "application-specific," "associated," "at least," "authorized," "binary," "both," "caused," "compiled," "comprising," "computational,"

"digital," "distributed," "encrypted," "established," "executing," "faster," "first," "immediately," "implemented," "in," "jointly," "less than," "low level," "memory," "non-volatile," "obfuscated," "parsing," "portion thereof," "prepared," "purged," "respectively," "running," "second," "secure," "so that," "some," "stored," "tangible," "thereof," "transistor-based," "when," "wherein," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise they will understand what is meant by "partly based" or other such descriptions of dependent computational variables/signals. "Numerous" as used herein refers to more than one dozen. "System" as used herein refers to any set of electronic components intermittently or otherwise operating as parts of a communication network or other cooperatively functional electronic implementation. "Immediate" as used herein refers to having a duration of less than 7 seconds unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon.

Terms like "processor," "module," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

As used herein an "instance" of a thing may include a perfect copy. A copied "instance" of a digital object, for example, may become a new version by being modified or created so as to differ in composition from the prior version. Not every new instance qualifies as a new "version," but every first and second versions of a digital object differ in composition. As used herein a "version" of a digital object refers to a variant having partial structural identicality with the object or partial functional identicality with the object (or both). For example, two "versions" of semicolons may exist in respective programming languages if at least one rule applicable to one does not apply to the other. As used herein a modification of a digital item is "facilitated" by triggering, enabling, defining, signaling, or causing the modification (or a combination of these).

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 depicts a system 100 and context in which herein-described inventive components may be situated on either side of a national border, or in the cloud, so as to interact with one or more remote complementary configurations (e.g., across the border). As shown such components or context may comprise one or more computers or other apparatuses 106A near Houston (Texas), one or more computers or other apparatuses 106B near Guadalajara (Mexico), and one or more networks 150 therebetween. Such apparatuses (or components therebetween) may include or trigger one or more processors 115 configured to handle various digital expressions described below.

In some variants this disclosure relates to apparatus and methods performed by and in pre-execution code processing computer device apparatuses, and modules thereof, to obfuscate or encrypt code to be executed (or both) as an encrypted pre-execution package, to create a secure execution environment for an encrypted pre-execution package (sometimes referred to as a "secure execution environment"), to distribute one or more pre-execution packages 160 and corresponding suitable secure execution environments 165, or for a code execution computer or modules 151-159 described herein (or both) to cause the encrypted pre-execution package 160 to be executed in the secure execution environment 165.

Cyberattacks come in many forms and in some contexts, it is helpful to have a pervasive and agile defense. As shown a client device or other hardware-implemented support apparatus 106A in Texas may interact with another hardware-implemented support apparatus 106B in Mexico via one or more communication channels 198A-B therebetween. In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any session parameters or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 108 may comprise one or more integrated circuits (ICs), for example, optionally mounted on one or more circuit boards. Whether implemented in a distributed cloud or within a local apparatus 106 or other devices described herein, transistor-based circuitry 108 comprises an event-sequencing structure generally as described in U.S. Pat. Pub. No. 2015/0094046 but configured as described herein. Transistor-based circuitry 108 may (optionally)

include one or more instances of invocation modules 151 configured to invoke one or more other modules 152-159 that consequently perform a function, for example, each including an electrical node set 171 upon which informational data is represented digitally as a corresponding voltage configuration 181. (It deserves emphasis that when a user or other signal originator "invokes" one or more modules 152-159 configured to perform a function, other circuitry along the signal path will also typically "invoke" circuitry downstream configured to perform that function, in a cascading fashion.)

Transistor-based circuitry 108 may likewise include one or more instances of interface modules 152 each including an electrical node set 172 upon which informational data is represented digitally as a corresponding voltage configuration 182. Transistor-based circuitry 108 may (optionally) include one or more instances of setup modules 153 each including an electrical node set 173 upon which informational data is represented digitally as a corresponding voltage configuration 183. Transistor-based circuitry 108 may likewise include one or more instances of security control modules 154 each including an electrical node set 174 upon which informational data is represented digitally as a corresponding voltage configuration 184. Transistor-based circuitry 108 may likewise include one or more instances of implementation modules 155 each including an electrical node set 175 upon which informational data is represented digitally as a corresponding voltage configuration 185. Transistor-based circuitry 108 may (optionally) include one or more instances of coder/decoder modules 156 each including an electrical node set 176 upon which informational data is represented digitally as a corresponding voltage configuration 186. Transistor-based circuitry 108 may likewise include one or more instances of processing modules 157 each including an electrical node set 177 upon which informational data is represented digitally as a corresponding voltage configuration 187. Transistor-based circuitry 108 may (optionally) include one or more instances of execution modules 158 each including an electrical node set 178 upon which informational data (e.g., signaling an execution speed, computational cost, or other metadata pertaining to such execution) is represented digitally as a corresponding voltage configuration 188.

Alternatively or additionally, such modules 151-158 may be implemented in or otherwise invoked by a local module 159, as further described below. Likewise each apparatus 106 herein may, in some variants, include one or more instances 149 of digitally implemented protocols 139A-H, of code or metadata expressions 142, of translations 143, of cache memories 144, of indexers 145, of records 146, of sequential versions 147 thereof, of dynamically generated languages 148, of local modules 159, of packages 160, of environments 165, or of memories 170 as further described below.

Methods and systems 100 herein may concern one or more security control modules 154 configured to cause at least some portion 62 or other expression 142 of the digital code 105 to become (one or more components 161 of) a prepared package 160 by undergoing a first fortification/obfuscation protocol 139A comprising an obfuscation protocol 139A or an encryption protocol 139F (or both). One or more setup modules 153 may then authorize or otherwise cause a first secure execution environment 165 to be adapted for use with the first prepared package 160 at or via a "first" (set of) apparatuses 106A and to be distributed with the first prepared package 160 to a complementary "second" (set of) one or more apparatuses 106A (e.g., near Houston as shown). One or more invocation modules 151 may thereafter authorize or otherwise cause at least some of the first prepared package 160 to be executed or otherwise used in the first secure execution environment 165 by or at the "second" (set of) one or more apparatuses 106B (e.g., near Guadalajara as shown).

Variants of system 100 are described below with regard to FIGS. 2-8. To encrypt or otherwise fortify code to be executed, a pre-execution code processing module of a pre-execution code processing computer may obtain code to be executed. Code 105 to be executed may be, for example, source code, a dynamically generated language, e.g., just-in-time ("JIT") compiled, e.g., JavaScript, a binary (or other base) executable. The pre-execution code processing module may obtain or generate encryption keys, e.g., a one-time pad plus an indexer, and may practice or obtain one or more fortification practices, e.g., invoking a translation or parsing protocol 139B-C for obfuscation. The one-time pad plus an indexer 145 or the translation or parsing protocol 139B-C for obfuscation may be unique for the code 105 to be executed. A pre-execution code processing module may encrypt, obfuscate, or translate the code to be executed with the encryption keys or with the translation or parsing protocol (or both) for obfuscation to produce an encrypted pre-execution package.

To create the secure execution environment for the encrypted pre-execution package, the pre-execution code processing module may create a corresponding secure execution environment, e.g., a script engine, a CPU or runtime virtualization environment containing decryption keys or a translation or parsing protocol 139B-C (or more than one of these) for de-obfuscation. The pre-execution code processing module may distribute the encrypted pre-execution package and a corresponding secure execution environment.

To execute the encrypted pre-execution package in the secure execution environment, a code execution module of the code execution computer may load the secure execution environment into memory. In some embodiments, the secure execution environment 165 or encrypted pre-execution package 160 (or both) may be loaded into (one or more instances 149 of a) cache memory 144, not (in any) main memory 170. In some embodiments, if or when stored in main memory 170, code of the secure execution environment or of an encrypted (instance of a) pre-execution package 160 may be encrypted and may not be conventionally executable. The code execution module may thus be configured to decrypt or de-obfuscate the encrypted pre-execution package (or both). In some embodiments, this may be performed using cache memory 144, producing unencrypted code in cache memory 144. The code execution module may, as necessary, compile and execute the unencrypted code and produce an unencrypted execution product using the secure execute environment. The unencrypted execution product of the secure execution environment may be encrypted and output or may be output in an unencrypted form. In some embodiments, the output may, optionally, be outside of (any) cache memory 144. In some embodiments, memory, including cache memory 144, may be purged.

The pre-execution code processing computer and code execution computer apparatuses may include hardware acceleration modules (e.g., comprising one or more chipsets or other local modules 159 described below) to accelerate the performance of other functional modules described herein by hardware of these apparatuses, for example, to allow the other modules to operate in what a user perceives as real time or within a commercially or computationally reasonable period of time. For example, (respective instances of) a hardware acceleration module 159 may be configured to perform encryption locally to a source apparatus 106 or decryption locally to a destination apparatus 106.

Preparation of the encrypted pre-execution package or its execution in the secure execution environment (or both) may only be four to one thousand times slower than conventional unencrypted execution. If cache memory 144 is used, execution of the unencrypted code in cache memory 144 requires that attacked computational surface area include a cache, which may be possible, but performance of the attacking software is thereby degraded. Furthermore, and regardless of use of cache memory 144, the attack must be repeated anew for each encrypted pre-execution package, to identify a decryption key (see FIG. 4) or translation protocol 139B or parsing protocol 139C configured for de-obfuscation for each encrypted pre-execution package 160, which also increases computational and human resource costs for the attacker.

In this way, pre-execution code processing computer and code execution computer and modules 151-158 thereof may provide some of the benefits of homomorphic encryption, such as reduced likelihood that code execution may be seen or interfered with (or both) by a hacker or malicious party, with significantly faster execution time and lower computational cost compared to (a comparable implementation of) homomorphic encryption.

Figure 2:
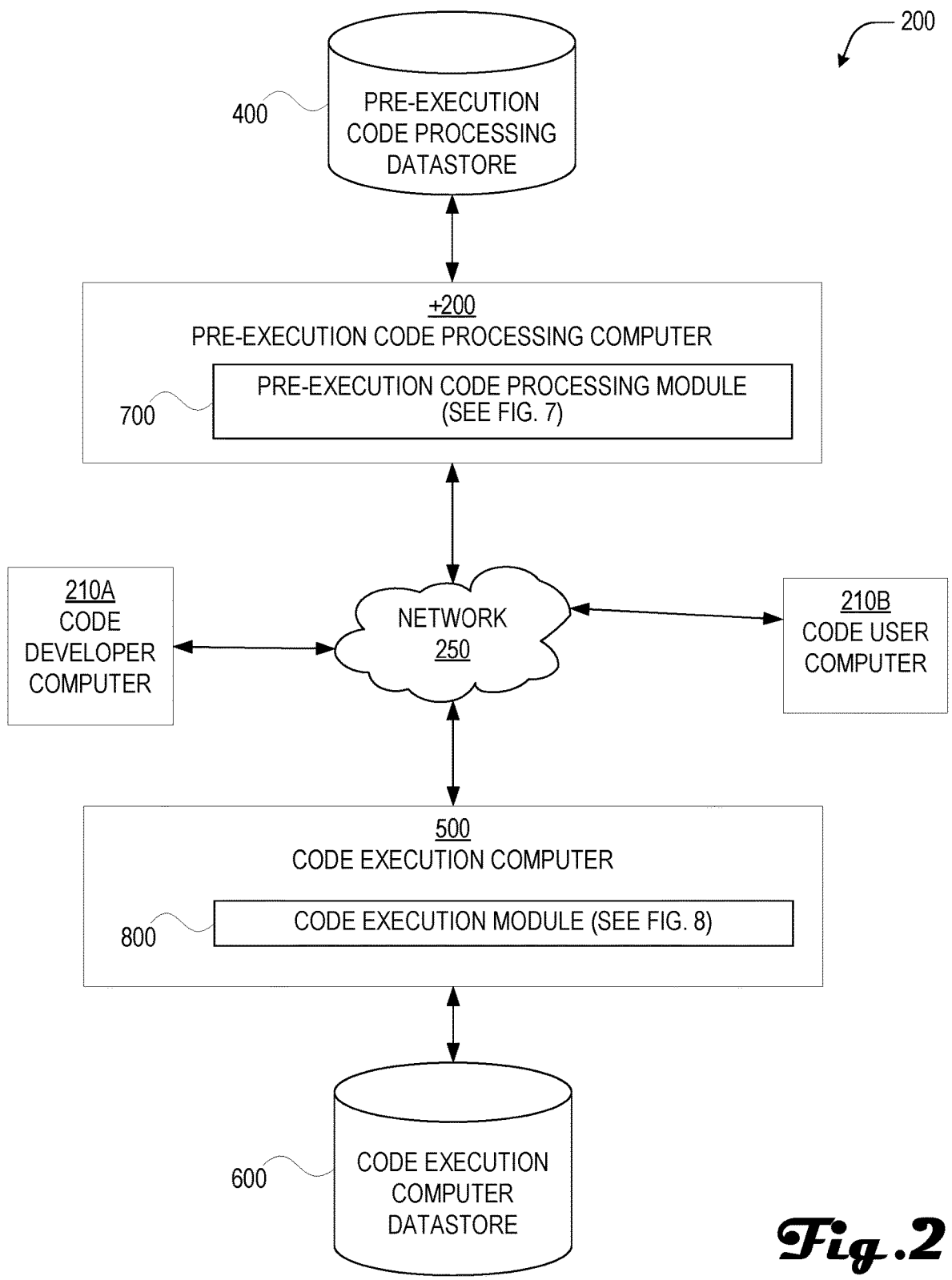
FIG. 2 depicts a network and device diagram illustrating an example of a pre-execution code processing computer, a pre-execution code processing computer datastore, a code developer computer, a code user computer, a code execution computer, a code execution computer datastore, and a network incorporated with teachings of the present disclosure, consistent with embodiments of the present disclosure.

FIG. 2 is a network and device diagram illustrating an example system 200 of pre-execution code processing computer 300, pre-execution code processing computer datastore 400, code developer computer 210A, code user computer 210B, code execution computer 500, code execution computer datastore 600, and network 250, according to some embodiments.

Pre-execution code processing computer 300 may execute, for example, pre-execution code processing module 700 to prepare encrypted pre-execution package 160 and secure execution environment 125, as described herein. Pre-execution code processing computer 300 may distribute encrypted pre-execution package 160 and secure execution environment 125 to, for example, code execution computer 500, where encrypted pre-execution package 160 and secure execution environment 125 may be stored as, for example, encrypted pre-execution package 620 and secure execution environment 625.

Code execution computer 500 may execute, for example, code execution module 800, as described herein. Code execution module 800 may load encrypted pre-execution package 620 and secure execution environment 625 in memory and may produce an unencrypted execution product. In some embodiments, code execution module 800 may load encrypted pre-execution package 620 and secure execution environment 625 in cache memory 144 514 of code execution computer 500. In some embodiments, code execution module 800 may load encrypted pre-execution package 620 and secure execution environment 625 into user space 390 or into user protected address space 360 of code execution computer 500. The unencrypted execution product may be output, such as via output 540 of code execution computer 500. When output outside of cache memory 144 514, such as in code execution computer datastore 600, the unencrypted execution product may be encrypted or may be unencrypted. The execution product may be stored in code execution computer datastore 600 as execution product 615.

Code developer computer 210A may be used by, for example, a software developer to write software code, such as code 405 to be executed, as described herein. Code developer computer 210A and pre-execution code processing computer 300 may be a same computer.

Code user computer 210B may be a computer of a party who uses a product of execution of encrypted pre-execution package 620, such as execution product 615.

One or more of pre-execution code processing computer 300, pre-execution code processing computer datastore 400, code execution computer 500, code execution computer datastore 600, code developer computer 210A, and code user computer 210B illustrated in FIG. 2 may be connected via network 250.

Pre-execution code processing computer 300 (e.g., optionally as an instance of one or more apparatuses 106A-B described herein) is illustrated as connecting to pre-execution code processing computer datastore 400. Pre-execution code processing computer datastore 400 is described further, herein, though, generally, should be understood as a datastore used by pre-execution code processing computer 300. Code execution computer 500 (e.g., optionally as an instance of one or more apparatuses 106A-B described herein) is illustrated as connecting to code execution computer datastore 600. Code execution computer datastore 600 is described further, herein, though, generally, should be understood as a datastore used by code execution computer 500.

Network 250 may comprise computers, network connections among the computers, and software routines to enable communication between the computers over the network connections. Examples of Network 250 comprise an Ethernet network, the Internet, and/or a wireless network, such as a GSM, TDMA, CDMA, EDGE, HSPA, LTE or other network provided by a wireless service provider. Connection to Network 250 may be via a Wi-Fi connection. More than one network may be involved in a communication session between the illustrated devices. Connection to Network 250 may require that the computers execute software routines which enable, for example, the seven layers of the OSI model of computer networking or equivalent in a wireless phone network.

Figure 3:
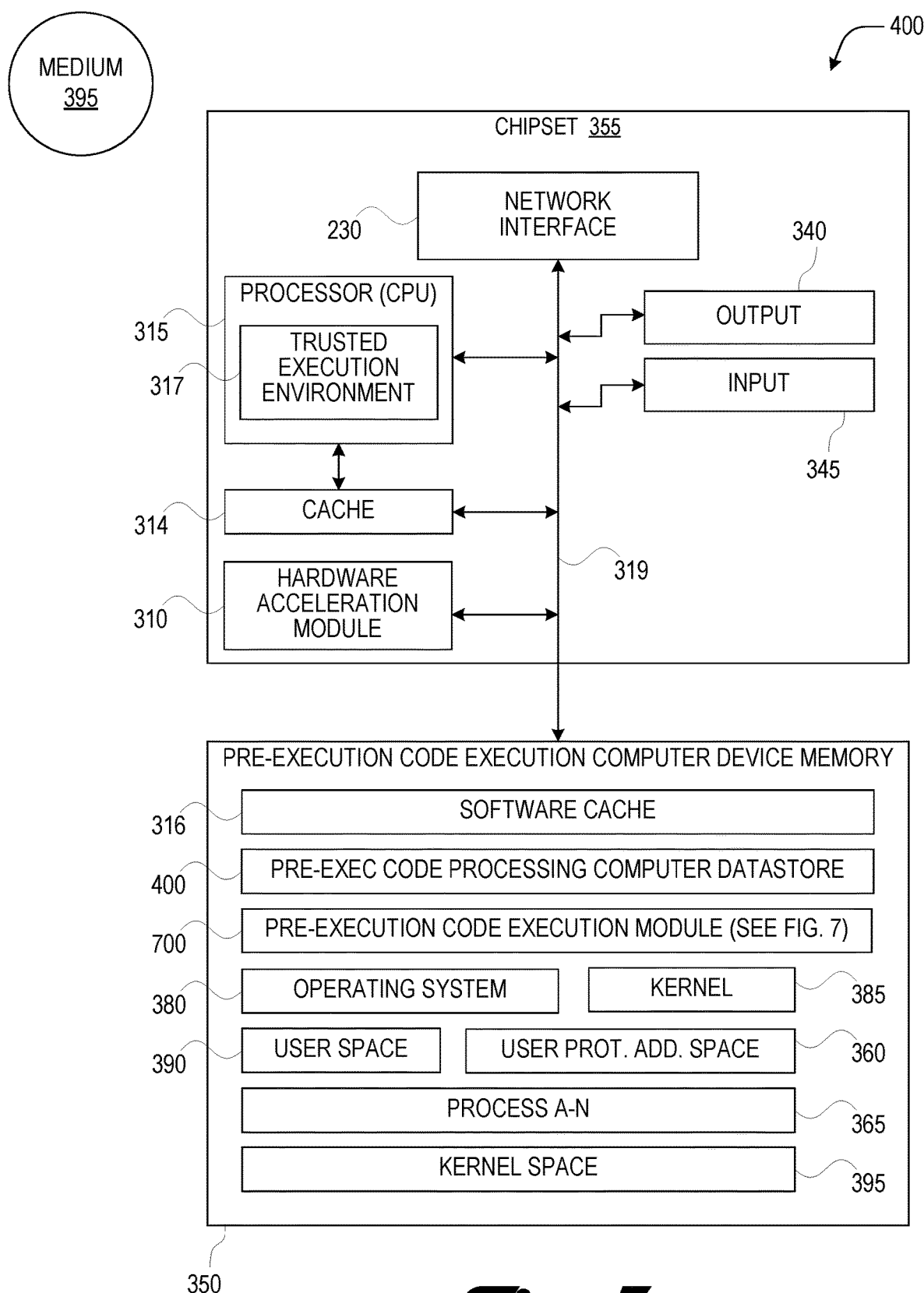
FIG. 3 depicts a functional block diagram illustrating an example of the pre-execution code processing computer of FIG. 2, incorporated with teachings of the present disclosure, consistent with embodiments of the present disclosure.

FIG. 3 is a functional block diagram illustrating an example of pre-execution code processing computer 300, incorporated with teachings of the present disclosure, according to some embodiments. Pre-execution code processing computer 300 may include chipset 355. Chipset 355 may include processor 315, cache 314, trusted execution environment 317, input/output (I/O) port(s) and peripheral devices, such as output 340 and input 345, network interface 330, and computer device memory 350, all interconnected via bus 319. Cache 314 may comprise a hierarchy of memory stores, e.g., tiered storage, which may be close to processor 315. In some embodiments, cache 314 may be supplemented by software cache 316, though when data is stored to or brought out of software cache 316, it may be encrypted. Use of cache 314 and software cache 316 may be controlled by, for example, cache policies, access policies, kernel 385, and the like.

Trusted execution environment (TEE) 317 may be a secure area of a main processor, such as processor 315. TEE 317 may guarantee code and data loaded into TEE 317 with respect to confidentiality and integrity. TEE 317 may comprise an isolated execution environment which may run in parallel with a standard operating system and may defend sensitive code and data against privileged software attacks from a potentially compromised native operating system. TEE 317 may restrict access to processor 315 such that only trusted applications running in TEE 317 have full access to processor 315. TEE 317 may use a hardware root of trust, in which a set of private keys are embedded directly into the chip during manufacturing, wherein the private keys have a public counterpart in manufacturer database, and, together with a non-secret hash of a public key belonging to the trusted application (generally obtained via a contractual relationship between the chip manufacturer and the developer of the trusted application), are used as a digital signature to verify access by the trusted application to the full set of functions of processor 315.

Network interface 330 may be utilized to form connections with network 250, with pre-execution code processing computer datastore 400, or to form device-to-device connections with other computers.

Chipset 355 may include communication components and/or paths, e.g., buses 320, that couple processor 315 to peripheral devices, such as, for example, via output 340 and input 345, which may be connected via I/O ports. Processor 315 may include one or more execution cores (CPUs). For example, chipset 355 may also include a peripheral controller hub (PCH) (not shown). In another example, chipset 355 may also include a sensors hub (not shown). Input 345 and output 340 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 345 and output 340 may be configured to transmit and/or receive commands and/or data according to one or more communications protocols 139E. For example, one or more of the I/O ports may comply and/or be compatible with a universal serial bus (USB) communications protocol 139E, peripheral component interconnect (PCI) communications protocol 139E (e.g., PCI express (PCIe)), or the like.

Hardware acceleration module 310 may provide hardware acceleration of various functions otherwise performed by pre-execution code processing module 700. Hardware acceleration module may be provided by, for example, Integrated Performance Primitives software library by Intel Corporation, as may be executed by an Intel (or other compatible) chip, and which may implement, for example, a library of programming functions involved with real time computer vision and machine learning systems. Such a library includes, for example, OpenCV. OpenCV includes, for example, application areas including 2D and 3D feature toolkits, egomotion estimation, facial recognition, gesture recognition, human-computer interaction, mobile robotics, motion understanding, object identification, segmentation and recognition, stereopsis stereo vision (including depth perception from two cameras), structure from motion, motion tracking, encryption, and augmented reality. OpenCV also includes a statistical machine learning library including boosting, decision tree learning, gradient boosting trees, expectation-maximization algorithms, k-nearest neighbor algorithm, naïve Bayes classifier, artificial neural networks, random forest, and a support vector machine.

Hardware acceleration module may be provided by, for example, NVIDIA® CUDA-X libraries, tools, and technologies built on NVIDIA CUDA® technologies. Such libraries may comprise, for example, math libraries, parallel algorithms, image and video libraries, communication libraries, deep learning libraries, and partner libraries. Math libraries may comprise, for example, a GPU-accelerated basic linear algebra (BLAS) library, a GPU-accelerated library for Fast Fourier Transforms, a GPU-accelerated standard mathematical function library, a GPU-accelerated random number generation (RNG), GPU-accelerated dense and sparse direct solvers, GPU-accelerated BLAS for sparse matrices, a GPU-accelerated tensor linear algebra library, and a GPU-accelerated linear solvers for simulations and implicit unstructured methods. Parallel algorithm libraries may comprise, for example a GPU-accelerated library of C++ parallel algorithms and data structures. Image and video libraries may comprise, for example, a GPU-accelerated library for JPEG decoding, GPU-accelerated image, video, and signal processing functions, a set of APIs, samples, and documentation for hardware accelerated video encode and decode on various operating systems, and a software developer kit which exposes hardware capability of NVIDIA TURING™ GPUs dedicated to computing relative motion of pixels between images. Communication libraries may comprise a standard for GPU memory, with extensions for improved performance on GPUs, an open-source library for fast multi-GPU, multi-node communications that maximize bandwidth while maintaining low latency. Deep learning libraries may comprise, for example, a GPU-accelerated library of primitives for deep neural networks, a deep learning inference optimizer and runtime for product deployment, a real-time streaming analytics toolkit for AI-based video understanding and multi-sensor processing, and an open source library for decoding and augmenting images and videos to accelerate deep learning applications. Partner libraries may comprise, for example, OpenCV, FFmpeg, ArrayFire, Magma, IMSL Fortan Numerical Library, Gunrock, Cholmod, Triton Ocean SDK, CUVIlib, and others.

In some embodiments, hardware acceleration module 310 may be or comprise a programmed FPGA, i.e., a FPGA which gate arrays are configured with a bit stream to embody logic of the hardware accelerated function (equivalent to logic provided by the executable instructions of a software embodiment of the function). In some embodiments, hardware acceleration module 310 may also or alternatively include components of or supporting computer device memory 350.

Computer device memory 350 may generally comprise a random access memory ("RAM"), a read only memory ("ROM"), and a permanent mass storage device, such as a disk drive or SDRAM (synchronous dynamic random-access memory). Computer device memory 350 may store program code for modules and/or software routines, such as, for example, hardware acceleration module 310, pre-execution code processing computer datastore 400 (illustrated and discussed further in relation to FIG. 4) and pre-execution code processing module 700 (illustrated and discussed further in relation to FIG. 7).

Computer device memory 350 may also store operating system 380. These software components may be loaded from a non-transient computer readable storage medium 395 into computer device memory 350 using a drive mechanism associated with a non-transient computer readable storage medium 395, such as a floppy disc, tape, DVD/CD-ROM drive, memory card, or other like storage medium. In some embodiments, software components may also or instead be loaded via a mechanism other than a drive mechanism and computer readable storage medium 395 (e.g., via network interface 330).

Figure 4:
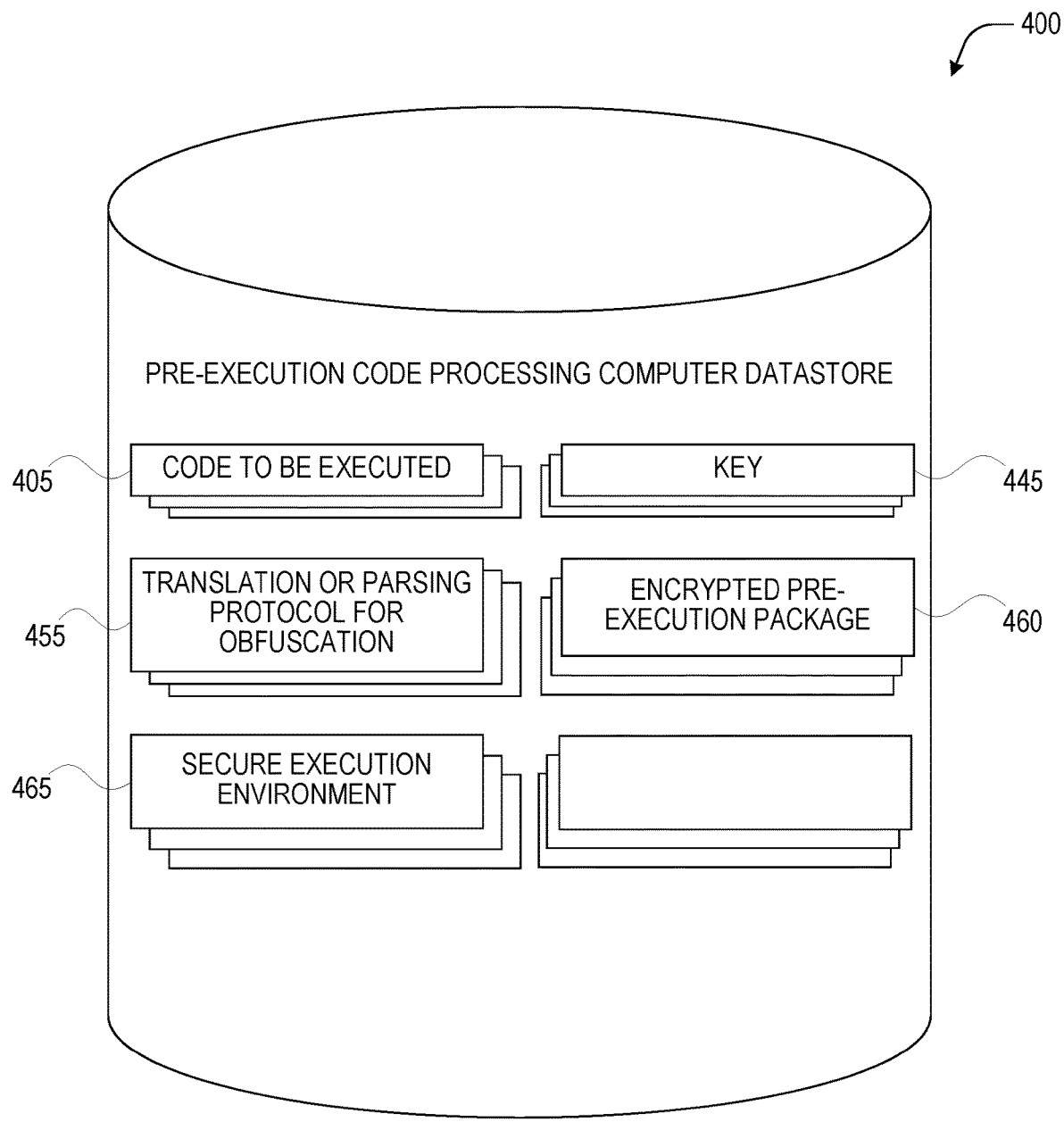
FIG. 4 depicts a functional block diagram illustrating an example of the pre-execution code processing computer datastore incorporated with teachings of the present disclosure, consistent with embodiments of the present disclosure.

Computer device memory 350 is also illustrated as comprising kernel 385, kernel space 395, user space 390, user protected address space 360, and pre-execution code processing computer datastore 400 (illustrated and discussed further in relation to FIG. 4).

Computer device memory 350 may store one or more process 365 (i.e., executing software application(s)). Process 365 may be stored in user space 390. Process 365 may include one or more other process 365a . . . 365n. One or more process 365 may execute generally in parallel, i.e., as a plurality of processes and/or a plurality of threads.

Computer device memory 350 is further illustrated as storing operating system 380 and/or kernel 385. The operating system 380 and/or kernel 385 may be stored in kernel space 395. In some embodiments, operating system 380 may include kernel 385. Operating system 380 and/or kernel 385 may attempt to protect kernel space 395 and prevent access by certain of process 365a . . . 365n.

Kernel 385 may be configured to provide an interface between user processes and circuitry associated with pre-execution code processing computer 300. In other words, kernel 385 may be configured to manage access to one or more instances of a processor 315, chipset 355, cache 314, software cache 316, TEE 317, or I/O ports and peripheral devices by process 365. Kernel 385 may include one or more drivers configured to manage and/or communicate with elements of pre-execution code processing computer 300 (i.e., processor 315, chipset 355, I/O ports and peripheral devices).

Pre-execution code processing computer 300 may also comprise or communicate via Bus 319 and/or network interface 330 with pre-execution code processing computer datastore 400, illustrated and discussed further in relation to FIG. 4. In various embodiments, bus 319 may comprise a high speed serial bus, and network interface 330 may be coupled to a storage area network ("SAN"), a high speed wired or wireless network, and/or via other suitable communication technology. Pre-execution code processing computer 300 may, in some embodiments, include many more components than as illustrated. However, it is not necessary that all components be shown in order to disclose an illustrative embodiment.

FIG. 4 is a functional block diagram of the pre-execution code processing computer datastore 400 illustrated in the computer device of FIG. 3, according to some embodiments. The components of pre-execution code processing computer datastore 400 may include data groups used by modules and/or routines, e.g., code 405 to be executed, encryption key 445, translation protocol 139B or parsing protocol 139C (or both) configured to provide (a service of effectively protective) obfuscation 455, encrypted pre-execution package 420, and secure execution environment 425 (to be described more fully below). The data groups used by modules or routines illustrated in FIG. 4 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of computer datastore 400 are discussed further herein in the discussion of other of the Figures.

Figure 5:
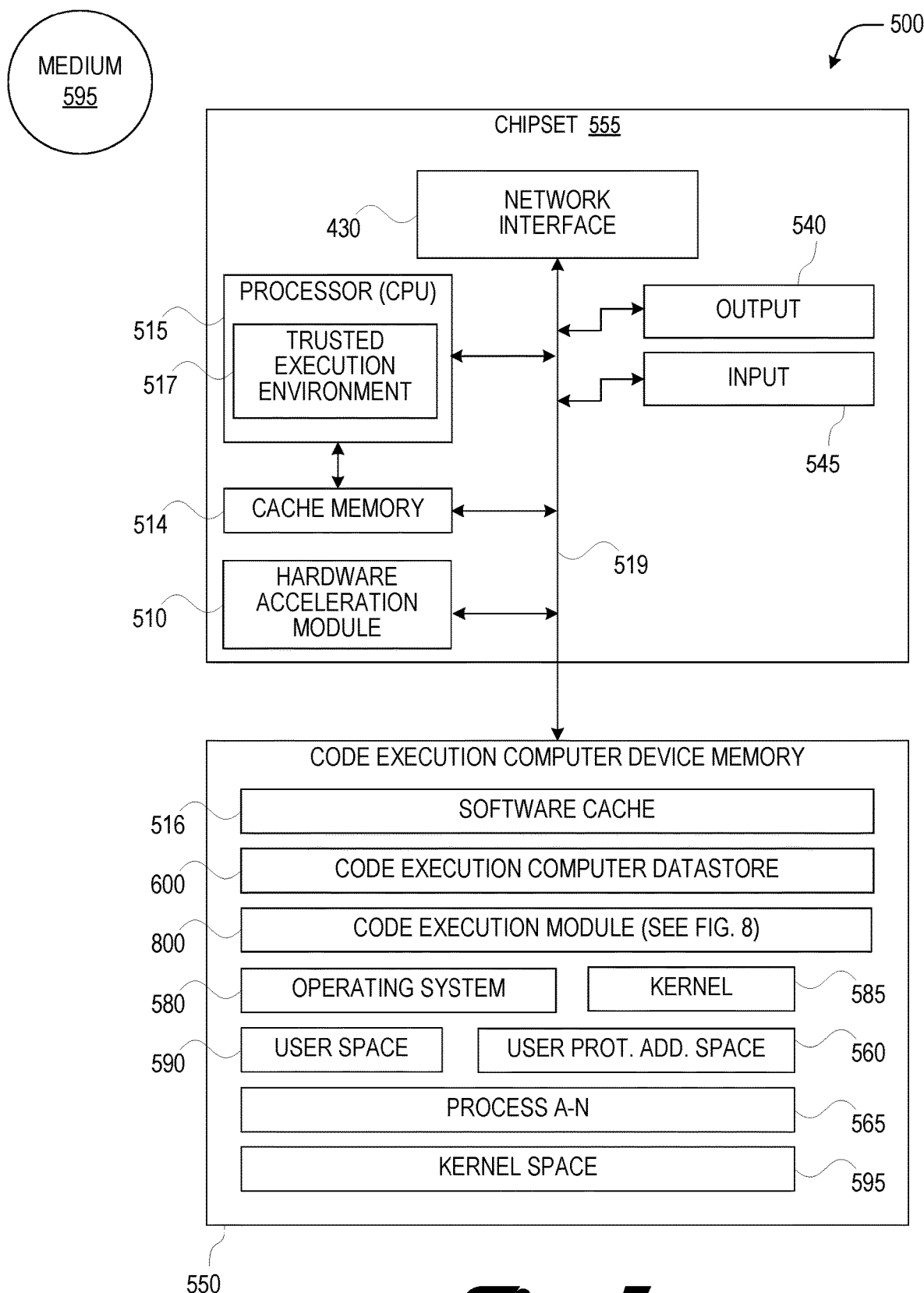
FIG. 5 depicts a functional block diagram illustrating an example of the code execution computer of FIG. 1, incorporated with teachings of the present disclosure, consistent with embodiments of the present disclosure.

FIG. 5 is a functional block diagram illustrating an example of code execution computer 500, incorporated with teachings of the present disclosure, according to some embodiments. Code execution computer 500 may include chipset 555. Chipset 555 may include processor 515, cache 514, trusted execution environment 517, input/output (I/O) port(s) and peripheral devices, such as output 540 and input 545, and network interface 530, and computer device memory 550, all interconnected via bus 519. Cache 514 may comprise a hierarchy of memory stores, e.g., tiered storage, which may be close to processor 515. In some embodiments, cache 514 may be supplemented by software cache 516, though when data is stored to or brought out of software cache 516, it may be encrypted. Use of cache 514 and software cache 516 may be controlled by, for example, cache policies, access policies, kernel 585, and the like.

Trusted execution environment (TEE) 517 may be a secure area of a main processor, such as processor 515. TEE 517 may guarantee code and data loaded into TEE 517 with respect to confidentiality and integrity. TEE 517 may comprise an isolated execution environment which may run in parallel with a standard operating system and may defend sensitive code and data against privileged software attacks from a potentially compromised native operating system. TEE 517 may restrict access to one or more instances of a processor 515 such that only trusted applications running in TEE 517 have full access to one or more instances of a processor 515. TEE 317 may use a hardware root of trust, in which a set of private keys are embedded directly into the chip during manufacturing, wherein the private keys have a public counterpart in manufacturer database, and, together with a non-secret hash of a public key belonging to the trusted application (generally obtained via a contractual relationship between the chip manufacturer and the developer of the trusted application), are used as a digital signature to verify access by the trusted application to the full set of functions of processor 515.

Network interface 530 may be utilized to form connections with network 250, with code execution computer datastore 600, or to form device-to-device connections with other computers.

Chipset 555 may include communication components and/or paths, e.g., buses 520, that couple processor 515 to peripheral devices, such as, for example, output 540 and input 545, which may be connected via I/O ports. Processor 515 may include one or more execution cores (CPUs). For example, chipset 555 may also include a peripheral controller hub (PCH) (not shown). In another example, chipset 555 may also include a sensors hub (not shown). Input 545 and output 540 may include, for example, user interface device (s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 545 and output 540 may be configured to transmit and/or receive commands and/or data according to one or more communications protocols 139E. For example, one or more of the I/O ports may comply and/or be compatible with a universal serial bus (USB) communications protocol 139E, peripheral component interconnect (PCI) communications protocol 139E (e.g., PCI express (PCIe)), or the like.

Hardware acceleration module 510 may provide hardware acceleration of various functions otherwise performed by code execution module 800. Hardware acceleration module may be provided by, for example, Integrated Performance Primitives software library by Intel Corporation, as may be executed by an Intel (or other compatible) chip, and which may implement, for example, a library of programming functions involved with real time computer vision and machine learning systems. Such a library includes, for example, OpenCV. OpenCV includes, for example, application areas including 2D and 3D feature toolkits, egomotion estimation, facial recognition, gesture recognition, human-computer interaction, mobile robotics, motion understanding, object identification, segmentation and recognition, stereopsis stereo vision (including depth perception from two cameras), structure from motion, motion tracking, and augmented reality. OpenCV also includes a statistical machine learning library including boosting, decision tree learning, gradient boosting trees, expectation-maximization algorithms, k-nearest neighbor algorithm, naïve Bayes classifier, artificial neural networks, random forest, and a support vector machine.

Hardware acceleration module may be provided by, for example, NVIDIA® CUDA-X libraries, tools, and technologies built on NVIDIA CUDA® technologies. Such libraries may comprise, for example, math libraries, parallel algorithms, image and video libraries, communication libraries, deep learning libraries, and partner libraries. Math libraries may comprise, for example, a GPU-accelerated basic linear algebra (BLAS) library, a GPU-accelerated library for Fast Fourier Transforms, a GPU-accelerated standard mathematical function library, a GPU-accelerated random number generation (RNG), GPU-accelerated dense and sparse direct solvers, GPU-accelerated BLAS for sparse matrices, a GPU-accelerated tensor linear algebra library, and a GPU-accelerated linear solvers for simulations and implicit unstructured methods. Parallel algorithm libraries may comprise, for example a GPU-accelerated library of C++ parallel algorithms and data structures. Image and video libraries may comprise, for example, a GPU-accelerated library for JPEG decoding, GPU-accelerated image, video, and signal processing functions, a set of APIs, samples, and documentation for hardware accelerated video encode and decode on various operating systems, and a software developer kit which exposes hardware capability of NVIDIA TURING™ GPUs dedicated to computing relative motion of pixels between images. Communication libraries may comprise a standard for GPU memory, with extensions for improved performance on GPUs, an open-source library for fast multi-GPU, multi-node communications that maximize bandwidth while maintaining low latency. Deep learning libraries may comprise, for example, a GPU-accelerated library of primitives for deep neural networks, a deep learning inference optimizer and runtime for product deployment, a real-time streaming analytics toolkit for AI-based video understanding and multi-sensor processing, and an open source library for decoding and augmenting images and videos to accelerate deep learning applications. Partner libraries may comprise, for example, OpenCV, FFmpeg, ArrayFire, Magma, IMSL Fortan Numerical Library, Gunrock, Cholmod, Triton Ocean SDK, CUVIlib, and others.

In some embodiments, hardware acceleration module 510 may be or comprise a programmed FPGA, i.e., a FPGA which gate arrays are configured with a bit stream to embody the logic of the hardware accelerated function (equivalent to the logic provided by the executable instructions of a software embodiment of the function). In some embodiments, hardware acceleration module 510 may also or alternatively include components of or supporting computer device memory 550.

Computer device memory 550 may generally comprise a random access memory ("RAM"), a read only memory ("ROM"), and a permanent mass storage device, such as a disk drive or SDRAM (synchronous dynamic random-access memory). Computer device memory 550 may store program code for modules and/or software routines, such as, for example, hardware acceleration module 510, code execution computer datastore 600 (illustrated and discussed further in relation to FIG. 6) and code execution module 800 (illustrated and discussed further in relation to FIG. 8).

Computer device memory 550 may also store operating system 580. These software components may be loaded from a non-transient computer readable storage medium 595 into computer device memory 550 using a drive mechanism associated with a non-transient computer readable storage medium 595, such as a floppy disc, tape, DVD/CD-ROM drive, memory card, or other like storage medium. In some embodiments, software components may also or instead be loaded via a mechanism other than a drive mechanism and computer readable storage medium 595 (e.g., via network interface 530).

Figure 6:
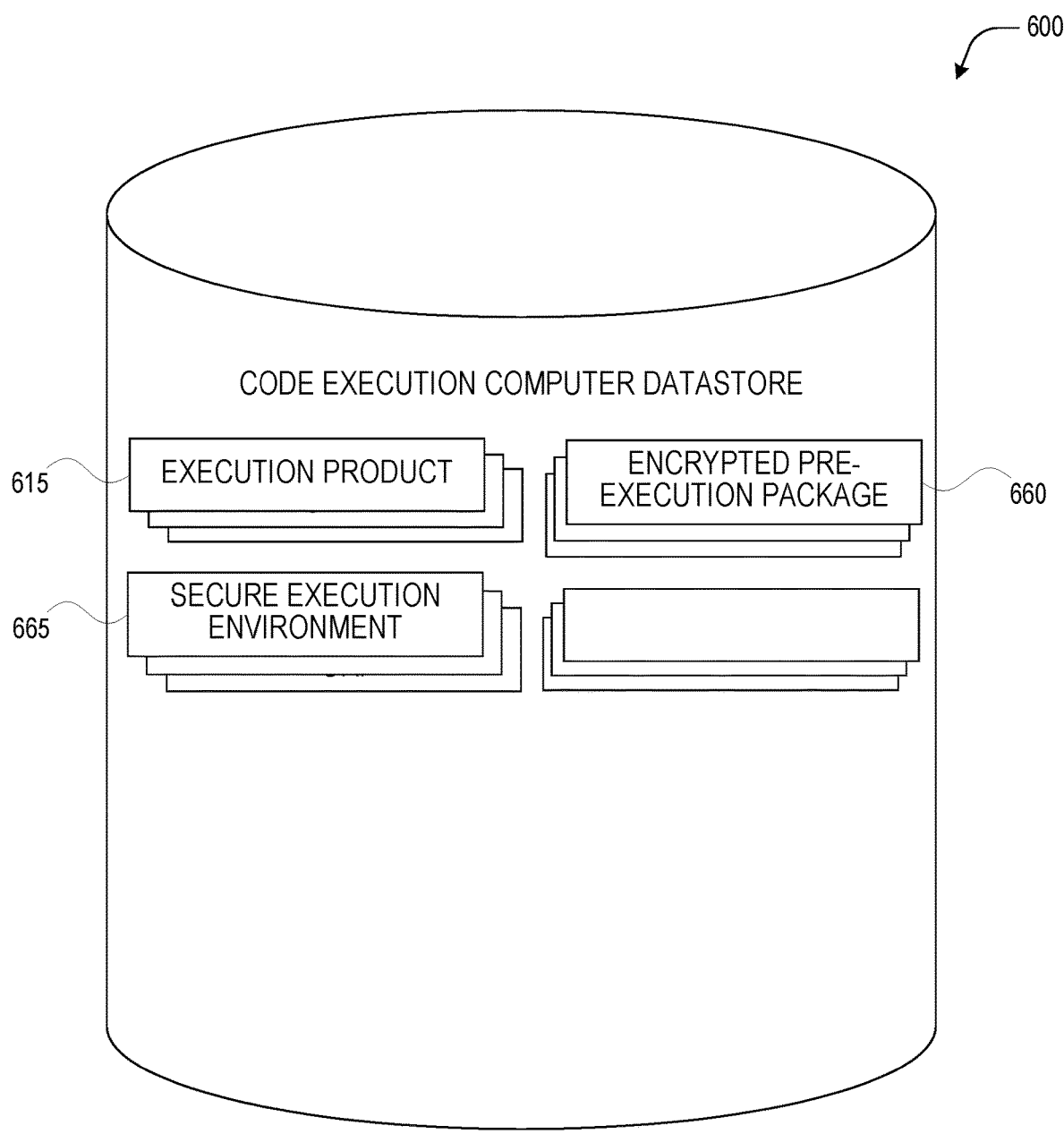
FIG. 6 depicts a functional block diagram illustrating an example of the code execution computer datastore of FIG. 2, incorporated with teachings of the present disclosure, consistent with embodiments of the present disclosure.

Computer device memory 550 is also illustrated as comprising kernel 585, kernel space 595, user space 590, user protected address space 560, and code execution computer datastore 600 (illustrated and discussed further in relation to FIG. 6).

Computer device memory 550 may store one or more process 565 (i.e., executing software application(s)). Process 565 may be stored in user space 590. Process 565 may include one or more other process 565a . . . 565n. One or more process 565 may execute generally in parallel, i.e., as a plurality of processes and/or a plurality of threads.

Computer device memory 550 is further illustrated as storing operating system 580 and/or kernel 585. The operating system 580 and/or kernel 585 may be stored in kernel space 595. In some embodiments, operating system 580 may include kernel 585. Operating system 580 and/or kernel 585 may attempt to protect kernel space 595 and prevent access by certain of process 565a . . . 565n.

Kernel 585 may be configured to provide an interface between user processes and circuitry associated with code execution computer 500. In other words, kernel 585 may be configured to manage access to one or more instances of a processor 515, chipset 555, cache 514, software cache 516, TEE 517, I/O ports and peripheral devices by process 565. Kernel 585 may include one or more drivers configured to manage and/or communicate with elements of code execution computer 500 (i.e., processor 515, chipset 555, I/O ports and peripheral devices).

Code execution computer 500 may also comprise or communicate via Bus 519 and/or network interface 530 with code execution computer datastore 600, illustrated and discussed further in relation to FIG. 6. In various embodiments, bus 519 may comprise a high speed serial bus, and network interface 530 may be coupled to a storage area network ("SAN"), a high speed wired or wireless network, and/or via other suitable communication technology. Code execution computer 500 may, in some embodiments, include many more components than as illustrated. However, it is not necessary that all components be shown in order to disclose an illustrative embodiment.

FIG. 6 is a functional block diagram of the code execution computer datastore 600 illustrated in the computer device of FIG. 5, according to some embodiments. The components of code execution computer datastore 600 may include data groups used by modules and/or routines, e.g., encrypted pre-execution package 620, and secure execution environment 625 (to be described more fully below). The data groups used by modules or routines illustrated in FIG. 6 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of computer datastore 600 are discussed further herein in the discussion of other of the Figures.

Figure 7:
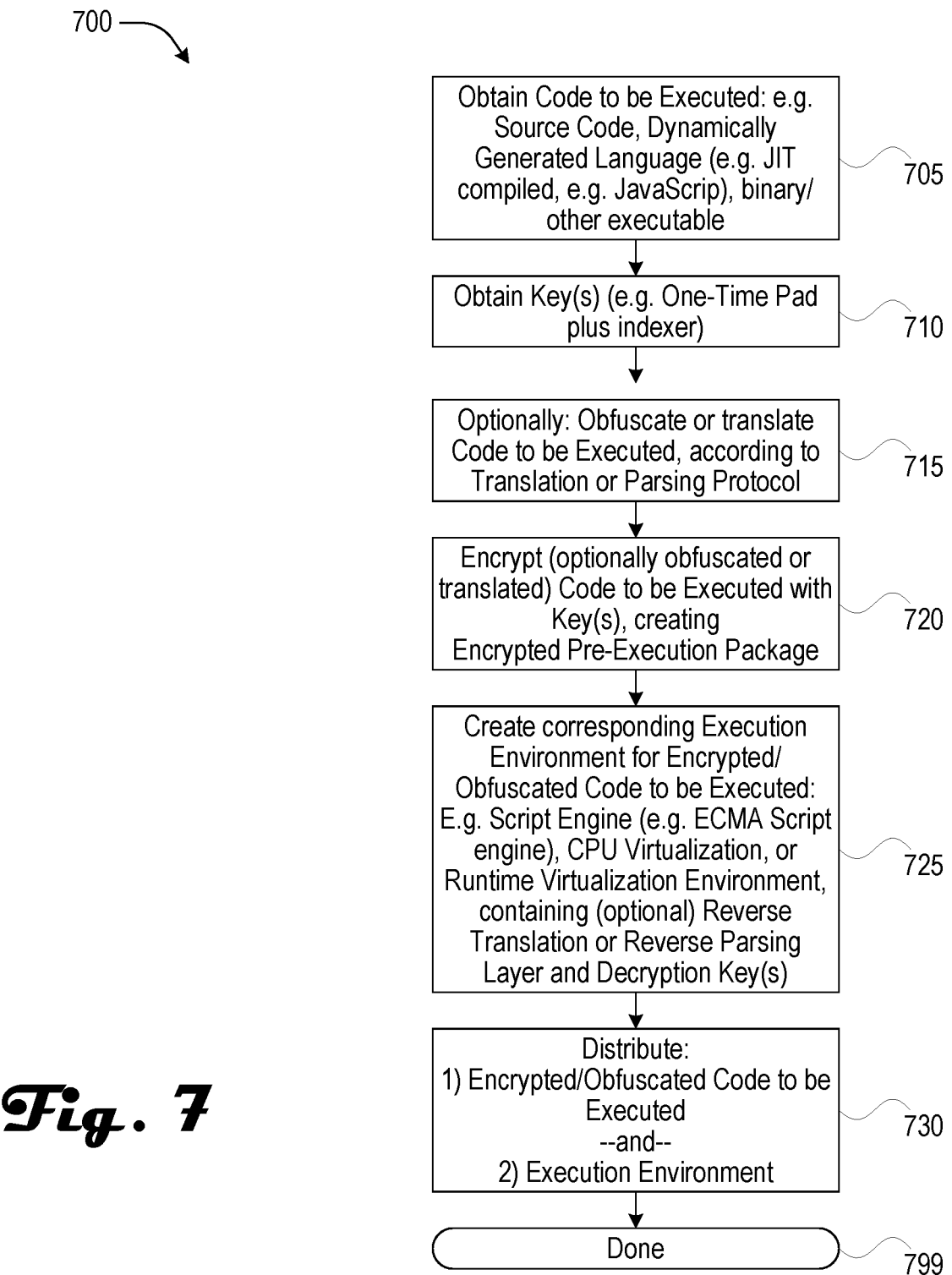
FIG. 7 depicts a flow diagram illustrating an example of a method performed by a pre-execution code processing module, consistent with embodiments of the present disclosure.

FIG. 7 is a flow diagram illustrating an example of pre-execution code processing module 700 which may be performed by pre-execution code processing computer device(s), such as pre-execution code processing computer 300, according to some embodiments. These modules may be implemented as or with the assistance of a hardware accelerator, such as hardware acceleration module 310 or TEE 317 (or both).

At block 705, pre-execution code processing module 700 may obtain code to be executed. Code to be executed may be, for example, source code, a dynamically generated language such as a just-in-time ("JIT") compiled language (e.g., JavaScript), compiled object code, a binary (or other base) executable, and the like. Code to be executed may be stored as, for example, one or more code 405 to be executed records. In some embodiments, code to be executed may be received and stored in an encrypted form.

At block 710, pre-execution code processing module 700 may generate or obtain encryption keys. Encryption keys may be, for example, a one-time pad, a one-time pad plus an indexer, a symmetric encryption key used for both encryption and decryption, one of an asymmetric key pair, such as a private key, and the like. In the case of a one-time pad, the key should be the same size or larger than the data to be encrypted. An indexer may be used to shift the index point for the one-time pad, wherein the shift may be random, quasi-random, or otherwise difficult to predict. The encryption key 445 or indexer 145 (or both) may be stored as, for example, one or more encryption key record.

At block 715, pre-execution code processing module 700 may optionally obfuscate or translate code to be executed, such as according to a translation or parsing protocol. The translation or other obfuscation may make it more difficult to observe execution of the code to be executed and to decompile or reverse engineer its functions.

At block 720, pre-execution code processing module 700 may encrypt the optionally obfuscated or translated code to be executed with the key(s), thereby creating an encrypted pre-execution package. The encrypted pre-execution package may be stored as, for example, one or more encrypted pre-execution package 420 records.

At block 725, pre-execution code processing module 700 may create a corresponding execution environment for the encrypted pre-execution package 420. The execution environment may comprise a decryption key 445 or de-obfuscation protocol 139D (or both) corresponding to the encryption key 445 used to create the encrypted pre-execution package 420. The type of execution environment may depend on the type of code used to prepare the encrypted pre-execution package 420 record(s). For example, if the code 405 to be executed in the encrypted pre-execution package 420 contains JavaScript, the execution environment may be a script engine containing the decryption key(s) or a translation protocol 139B or parsing protocol 139C (or both) configured for obfuscation 455. For example, if the in the encrypted pre-execution package 420 contains compiled object code, the execution environment may comprise a CPU virtualization or a runtime virtualization environment containing the decryption key(s) and one or more protocols 139A configured to provide obfuscation 455 or other fortification. The corresponding execution environment may be stored as, for example, one or more secure execution environment 425 record(s).

At block 730, pre-execution code processing module 700 may distribute the encrypted pre-execution package 420 or one or more secure execution environment records 146 (or both). Distribution may be to, for example, one or more code execution computer 500 or a datastore thereof.

At block 799, pre-execution code processing module 700 may conclude and/or return to a module and/or another process which may have called it.

Figure 8:
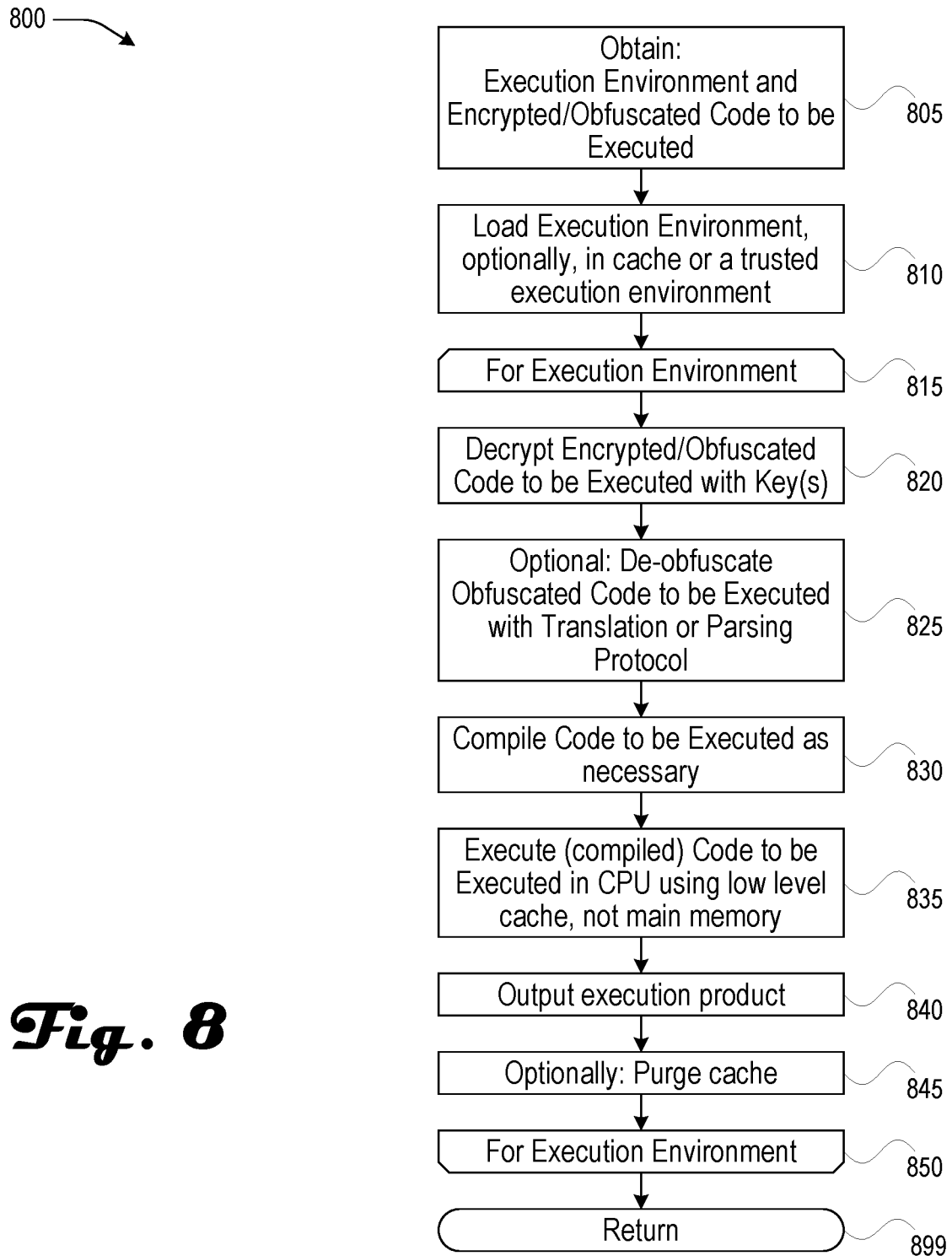
FIG. 8 depicts a flow diagram illustrating an example of a method performed by a code execution module, consistent with embodiments of the present disclosure.

FIG. 8 is a flow diagram illustrating an example of code execution module 800 which may be performed by pre-execution code processing computer device(s), such as pre-execution code processing computer 300, according to some embodiments. These modules may be performed by or with the assistance of a hardware accelerator, such as a hardware acceleration module 310 or TEE 517 (or both).

At block 805, code execution module 800 may obtain encrypted pre-execution package 420 and a secure execution environment 425 record(s), such as from pre-execution code processing module 700 of pre-execution code processing computer 300. Code execution module 800 may store these as, for example, one or more encrypted pre-execution package 620 and a secure execution environment 625 record(s).

At block 810, code execution module 800 may load the secure execution environment. In some embodiments, code execution module 800 may load the secure execution environment may load the secure execution environment into cache, such as in cache 514. In some embodiments, code execution module 800 may load the secure execution environment into a user space or a user protected address space. In some embodiments, code execution module 800 may load the secure execution environment with access to one or more instances of a TEE 517.

Opening loop block 815 to closing loop block 850 may iterate over the secure execution environment.

At block 820, code execution module 800 may decrypt code to be executed, such as by decryption of encrypted pre-execution package 620.

At block 825, code execution module 800 may optionally de-obfuscate, translate, or parse code to be executed, such as with a translation or parsing protocol 139B-C that may be part of the secure execution environment 165.

At block 830, code execution module 800 may, if necessary, compile the code to be executed.

At block 835, code execution module 800 may execute the compiled code to be executed.

At block 840, code execution module 800 may output an execution product, from execution of the compiled code to be executed. The execution product may be output, such as via output 540, or may be stored as one or more records 146 that express an execution product 615. After being output or stored, in some variants, an execution product 615 may be unencrypted or encrypted.

At block 899, code execution module 800 may return, conclude and/or may return to a process which may have spawned or called it.

Embodiments of the operations described herein may be implemented in a computer-readable storage device (e.g., as apparatuses 106 described herein) having stored thereon instructions that when executed by one or more processors perform the methods. Processors 115 thereof may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high-speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s). In various embodiments any of the herein-described content may be implemented in a server, peer-to-peer network, Virtual Private Network (VPN), or other configuration of computers or other electronic components. Such cooperatively configured apparatuses 106A-B may be implemented locally (e.g., on one or more chipsets within a single facility, city, county, state, or other geographic proximity) or may be geographically distributed (i.e. spanning more than 100 kilometers or across borders as shown).

In light of teachings herein, numerous existing techniques may be applied for configuring special-purpose circuitry or other structures effective for securing, monitoring, connecting, analyzing, modeling, translating, recognizing, recording, retrieving, reverting, facilitating, and other operations as described herein without undue experimentation. See, e.g., U.S. patent Ser. No. 10/701,213 ("Dynamically generating an aggregation routine"); U.S. patent Ser. No. 10/416,979 ("Package installation on a host file system using a container"); U.S. patent Ser. No. 10/382,424 ("Secret store for OAuth offline tokens"); U.S. patent Ser. No. 10/360,150 ("Techniques for managing memory in a multiprocessor architecture"); U.S. patent Ser. No. 10/356,155 ("Service onboarding"); U.S. patent Ser. No. 10/339,837 ("Distribution of scrambled binary output using a randomized compiler"); U.S. patent Ser. No. 10/142,453 ("User interface for a computing device"); U.S. patent Ser. No. 10/127,160 ("Methods and systems for binary scrambling"); U.S. patent Ser. No. 10/050,797 ("Inserting snapshot code into an application"); U.S. patent Ser. No. 10/033,604 ("Providing compliance/monitoring service based on content of a service controller"); U.S. Pat. No. 9,923,793 ("Client-side measurement of user experience quality"); U.S. Pat. No. 9,807,077 ("Systems and methods for containerized data security"); U.S. Pat. No. 9,665,474 ("Relationships derived from trace data"); U.S. Pat. No. 9,558,362 ("Data encryption using an external arguments encryption algorithm"); U.S. Pat. No. 9,483,590 ("User-defined application models"); U.S. Pat. No. 9,465,721 ("Snapshotting executing code with a modifiable snapshot definition"); U.S. Pat. No. 9,417,859 ("Purity analysis using white list/black list analysis"); U.S. Pat. No. 9,389,992 ("Multiple tracer configurations applied on a function-by-function level"); U.S. Pat. No. 9,292,415 ("Module specific tracing in a shared module environment"); U.S. Pat. No. 9,286,042 ("Control flow graph application configuration"); U.S. Pat. No. 9,141,502 ("Method and system for providing high availability to computer applications"); U.S. Pat. No. 9,021,445 ("Tracer list for automatically controlling tracer behavior"); U.S. Pat. No. 8,978,016 ("Error list and bug report analysis for configuring an application tracer"); U.S. Pat. No. 8,966,462 ("Memory management parameters derived from system modeling"); U.S. Pat. No. 8,909,546 ("Privacy-centric ad models that leverage social graphs"); U.S. Pat. No. 8,849,968 ("Secure and stable hosting of third-party extensions to web services"); U.S. Pat. No. 8,775,437 ("Dynamic reranking of search results based upon source authority"); U.S. Pat. No. 8,694,574 ("Optimized settings in a configuration database with boundaries"); U.S. Pat. No. 8,656,378 ("Memorization configuration file consumed at compile time"); U.S. Pat. No. 8,656,135 ("Optimized memory configuration deployed prior to execution"); U.S. Pat. No. 8,650,538 ("Meta garbage collection for functional code"); U.S. Pat. No. 8,595,743 ("Network aware process scheduling"); U.S. Pat. No. 8,312,273 ("Privacy vault for maintaining the privacy of user profiles"); U.S. Pat. No. 8,014,308 ("Hardware architecture for cloud services"); and U.S. Pat. Pub. No. 20140274078 ("Protocols for facilitating broader access in wireless communications").

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, all of the words and phrases used will be understood to one of ordinary skill as being either a natural language expression with a plain meaning or a term of art to be construed in light of statements herein. First combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

1. A security enhancement method pertaining to digital code 105, 405 comprising:

directly or otherwise invoking first transistor-based circuitry (e.g., one or more security control modules 154) configured to cause at least some of the digital code 105, 405 to become (one or more components 161 of) a first prepared package 160, 460, 660 by undergoing a first fortification/obfuscation protocol 139A (e.g., comprising an obfuscation protocol 139A or an encryption protocol 139F (or both));

directly or otherwise invoking second transistor-based circuitry (e.g., one or more setup modules 153) configured to authorize or otherwise cause a first secure execution environment 165, 465, 665 to be adapted for use with the first prepared package 160, 460, 660 at or via a "first" (set of) apparatuses 106A-B and to be distributed with the first prepared package 160, 460, 660 to a complementary "second" (set of) one or more apparatuses 106A (e.g., near Houston); and directly or otherwise invoking third transistor-based circuitry (e.g., one or more invocation modules 151) configured to authorize or otherwise cause at least some of the first prepared package 160, 460, 660 (e.g., comprising one or more instances of precursors 141, of compiled expressions 142, of translations 143, or of other versions, instances or portions 61A-C of the digital code 105 or metadata thereof) to be executed or otherwise used in the first secure execution environment 165, 465, 665 by or at the "second" (set of) one or more apparatuses 106B (e.g., near Guadalajara).

2. The method of Clause 1 wherein the third transistor-based circuitry is configured to be invoked as an automatic response to the first transistor-based circuitry.

3. The method of Clause 1 wherein the third transistor-based circuitry is actually invoked as an automatic response to (one or more enabling signals from) the first transistor-based circuitry.

4. The method of Clause 1 wherein the third transistor-based circuitry is configured to be invoked as an automatic response to the second transistor-based circuitry.

5. The method of Clause 1 wherein the third transistor-based circuitry is actually invoked as an automatic response to a triggering signal from the first transistor-based circuitry. (e.g., one or more invocation modules 151) configured to authorize or otherwise cause at least some of the first prepared package 160, 460, 660 (e.g., comprising one or more instances of precursors 141, of compiled expressions 142, of translations 143, or of other versions, instances or portions 61A-C of the digital code 105 or metadata thereof) to be executed or otherwise used in the first secure execution environment 165, 465, 665 by or at the "second" (set of) one or more apparatuses 106B (e.g., near Guadalajara).

6. The method of any one of the above Clauses wherein the first secure execution environment 165, 465, 665 is thereby directly or otherwise adapted for use (e.g., as a TEE 317, 517) with the first prepared package 160, 460, 660 at or via a "first" (set of) one or more computers 210A and to be distributed with the first prepared package 160, 460, 660 to a "second" (set of) one or more computers 210B).

7. The method of any one of the above Clauses wherein the first secure execution environment 165, 465, 665 is thereby directly or otherwise adapted for use with the first prepared package 160, 460, 660 at a "first" (set of) one or more computers 210A and to be distributed with the first prepared package 160, 460, 660 to a "second" (set of) one or more computers 210B).

8. The method of any one of the above Clauses wherein the first secure execution environment 165, 465, 665 is thereby directly or otherwise adapted for use (e.g., as a TEE 317, 517) with the first prepared package 160, 460, 660 via a "first" (set of) one or more computers 210A and to be distributed with the first prepared package 160, 460, 660 to a "second" (set of) one or more computers 210B.

9. The method of any one of the above Clauses wherein the method provides a lower computational cost (e.g., represented digitally as one or more voltage configurations 188 on an electrical node set 178 in an apparatus 106 described herein) less than half of that of (a functionally corresponding) homomorphic encryption.

10. The method of any one of the above Clauses wherein the method provides a faster execution speed more than twice as fast as that of (a median or other typical corresponding) homomorphic encryption (e.g., manifested on an electrical node set 178 in an apparatus 106 described herein).

11. The method of any one of the above Clauses wherein a first (version or other) portion 61A of the digital code 405 to be executed is source code and wherein the first portion 61A is compiled so as to become binary code (e.g., device-executable machine code 105) as a second portion 61C thereof.

12. The method of any one of the above Clauses wherein a first (version or other) portion 61A of the digital code 405 to be executed is source code and wherein the first portion 61A is compiled so as to become binary code (e.g., device-executable machine code 105) as a second portion 61C thereof, the method comprising:

directly executing the second portion 61C thereof.

13. The method of any one of the above Clauses wherein a first (version or other) portion 61A of the digital code 405 to be executed is source code; wherein the first portion 61A is compiled so as to become binary code (e.g., device-executable machine code 105) as a second portion 61C thereof; and wherein (one or more processors 115, 315, 515 of the second one or more computers 210B indirectly executes the first portion 61A of the by directly executing the second portion 61C thereof.

14. The method of any one of the above Clauses wherein the at least one (version or other) expression 142 of the digital code 105 of the first prepared package 160, 460, 660 is executed without any of the digital code 105 having been (directly or otherwise) executed in a main memory 170 of any of the second one or more computers 210B.

15. The method of any one of the above Clauses wherein the first one or more computers (e.g., comprising apparatuses 106A) are configured at least to encrypt the first prepared package 160, 460, 660 and also configured to create the first secure execution environment 165, 465, 665 for the first prepared package 160, 460, 660 and wherein the second one or more computers (e.g., comprising apparatuses 106B) consequently executes the first prepared package 160, 460, 660 in the first secure execution environment 165, 465, 665.

16. The method of any one of the above Clauses wherein the first one or more computers 210A are configured at least to encrypt the first prepared package 160, 460, 660 and also configured to create the first secure execution environment 165, 465, 665 for the first prepared package 160, 460, 660 and wherein the second one or more apparatuses 106B is thereby triggered to execute the first prepared package 160, 460, 660 in the first secure execution environment 165, 465, 665 immediately.

17. The method of any one of the above Clauses wherein the first one or more computers 210A are configured at least to obfuscate the first prepared package 160, 460, 660 and also respectively or jointly configured to create the first secure execution environment 165, 465, 665 for the first prepared package 160, 460, 660 and wherein a second one or more computers 210B thereby configures the first prepared package 160, 460, 660 for use in the first secure execution environment 165, 465, 665.

18. The method of any one of the above Clauses wherein the first one or more computers (e.g., comprising apparatuses 106A) are configured at least to encrypt the first prepared package 160, 460, 660 and also configured to create the first secure execution environment 165, 465, 665 for the first prepared package 160, 460, 660 and wherein the second one or more computers (e.g., comprising apparatuses 106B) consequently executes the first prepared package 160, 460, 660 in the first secure execution environment 165, 465, 665.

19. The method of any one of the above Clauses wherein the first one or more computers 210A are configured at least to obfuscate the first prepared package 160, 460, 660 and also configured to create the first secure execution environment 165, 465, 665 for the first prepared package 160, 460, 660 and wherein the second one or more apparatuses 106B is thereby triggered to execute the first prepared package 160, 460, 660 in the first secure execution environment 165, 465, 665 immediately.

20. The method of any one of the above Clauses wherein the first one or more computers 210A are configured at least to obfuscate the first prepared package 160, 460, 660 and also respectively or jointly configured to create the first secure execution environment 165, 465, 665 for the first prepared package 160, 460, 660 and wherein a second one or more computers 210B thereby configures the first prepared package 160, 460, 660 for use in the first secure execution environment 165, 465, 665.

21. The method of any one of the above Clauses wherein the first prepared package 160, 460, 660 is configured to be executed in the first secure execution environment 165, 465, 665 using at least one of cache memory 144 514 or the first secure execution environment 165, 465, 665 (or both).

22. The method of any one of the above Clauses wherein the first prepared package 160, 460, 660 is thereby executed in the first secure execution environment 165, 465, 665 using at least (some) cache memory 144 514.

23. The method of any one of the above Clauses wherein the first prepared package 160, 460, 660 is thereby executed in the first secure execution environment 165, 465, 665 within cache memory 144 514.

24. The method of any one of the above Clauses wherein an encryption key 445 and indexer 145 thereof are both stored in one or more encryption keys record 146.

25. The method of any one of the above Clauses wherein an encryption key 445 and indexer 145 thereof are both stored in a first shared encryption key record 146.

26. The method of any one of the above Clauses wherein the first prepared package 160, 460, 660 is configured to be executed in the first secure execution environment 165, 465, 665 using the first secure execution environment 165, 465, 665.

27. The method of any one of the above Clauses wherein the first prepared package 160, 460, 660 is configured to be executed in the first secure execution environment 165, 465, 665 using at least one of cache memory 144 514 or the first secure execution environment 165, 465, 665 (or both) and wherein the cache memory 144 514 is purged following execution in the first secure execution environment 165, 465, 665 (e.g., according to one or more maintenance protocols 139G).

28. The method of any one of the above Clauses wherein the code 105, 405 to be executed comprises (at least one instance 149 of) source code 105, 405.

29. The method of any one of the above Clauses wherein the code 105, 405 to be executed comprises (at least one instance 149 of) a dynamically generated language 148.

30. The method of any one of the above Clauses wherein the code 105, 405 to be executed comprises (at least one instance 149 of) compiled object code 105, 405.

31. The method of any one of the above Clauses wherein the code 105, 405 to be executed comprises (at least one instance 149 of) a binary or other base executable.

32. The method of any one of the above Clauses wherein the digital code 105, 405 is encrypted using one or more encryption keys 445 before ever being executed (directly or otherwise) in the first secure execution environment 165, 465, 665.

33. The method of any one of the above Clauses wherein (at least a portion 61 of) the digital code 105, 405 is encrypted, distributed, and decrypted using one or more encryption keys 445 before ever being executed in the first secure execution environment 165, 465, 665 via one or more local protocol implementation modules 159 in the second one or more computers 210B.

34. The method of any one of the above Clauses wherein the digital code 105, 405 is obfuscated using (at least) one or more translation protocols 139B before ever being executed in the first secure execution environment 165, 465, 665.

35. The method of any one of the above Clauses wherein (at least some of) the digital code 105, 405 is obfuscated using one or more (translation protocols 139B or other) parsing protocols 139C before ever being executed in the first secure execution environment 165, 465, 665.

36. The method of any one of the above Clauses wherein the digital code 105, 405 is obfuscated using one or more (translation protocols 139B or other) encryption protocols 139F before ever being executed in the first secure execution environment 165, 465, 665.

37. The method of any one of the above Clauses wherein (at least a portion 61 of) the digital code 105, 405 is obfuscated using one or more encryption keys 445 before ever being executed in the first secure execution environment 165, 465, 665.

38. The method of any one of the above Clauses wherein an entirety of the digital code 105, 405 is temporarily obfuscated as described herein before ever being executed in the first secure execution environment 165, 465, 665.

39. The method of any one of the above Clauses wherein the first secure execution environment 165, 465, 665 comprises at least one of a decryption key 445 or translation protocol 139B effective for de-obfuscation whereby the at least some (e.g., a processed portion 61B) of the first prepared package 160, 460, 660 is thereafter executed safely in the first secure execution environment 165, 465, 665 without any obfuscation.

40. The method of any one of the above Clauses wherein the first secure execution environment 165, 465, 665 comprises a decryption key 445 effective for de-obfuscation whereby the at least some of the first prepared package 160, 460, 660 is thereafter executed safely in the first secure execution environment 165, 465, 665 without any obfuscation.

41. The method of any one of the above Clauses wherein the first secure execution environment 165, 465, 665 comprises (at least) a translation protocol 139B effective for de-obfuscation whereby the at least some of the first prepared package 160, 460, 660 is thereafter executed safely in the first secure execution environment 165, 465, 665 without any obfuscation.

42. The method of any one of the above Clauses wherein the first secure execution environment 165, 465, 665 comprises a parsing protocol 139C effective for de-obfuscation whereby the at least some (e.g., one or more portions 61) of the first prepared package 160, 460, 660 is thereafter executed safely in the first secure execution environment 165, 465, 665 without any obfuscation.

43. The method of any one of the above Clauses wherein executing the first prepared package 160, 460, 660 in the first secure execution environment 165, 465, 665 comprises: at least one of decrypting or de-obfuscating the first prepared package 160, 460, 660 in the first secure execution environment 165, 465, 665.

44. The method of any one of the above Clauses wherein executing the first prepared package 160, 460, 660 in the first secure execution environment 165, 465, 665 comprises:

at least one of decrypting or de-obfuscating the first prepared package 160, 460, 660 in the first secure execution environment 165, 465, 665 and thereafter compiling a first portion 61A of the digital code 105, 405 so that a compiled second (version or other) portion 61A of the digital code 105, 405 is established (e.g., via a compilation or other preparatory protocol 139H) in the first secure execution environment 165, 465, 665 (e.g., directly or otherwise via one or more protocol implementation modules 159 associated with one or more corresponding protocols 139A-H described herein).

45. The method of any one of the above Clauses wherein a compiled version 147 of the digital code 105, 405 is established (e.g., via a compilation or other preparatory protocol 139H) in the first secure execution environment 165, 465, 665 (e.g., via one or more local modules 159 associated with one or more corresponding protocols 139A-H described herein).

46. The method of any one of the above Clauses wherein executing the first prepared package 160, 460, 660 in the first secure execution environment 165, 465, 665 comprises:

decrypting the first prepared package 160, 460, 660 in the first secure execution environment 165, 465, 665 (e.g., as a preparatory protocol 139H).

47. The method of any one of the above Clauses wherein executing the first prepared package 160, 460, 660 in the first secure execution environment 165, 465, 665 comprises:

decrypting the first prepared package 160, 460, 660 in the first secure execution environment 165, 465, 665 and thereafter allowing (e.g., using a protocol implementation module 159) a compilation of a first portion 61B of the digital code 105, 405 so that a compiled second (version or other) portion 61C of the digital code 105, 405 is established in the first secure execution environment 165, 465, 665.

48. The method of any one of the above Clauses wherein executing the first prepared package 160, 460, 660 in the first secure execution environment 165, 465, 665 comprises:

de-obfuscating the first prepared package 160, 460, 660 in the first secure execution environment 165, 465, 665 (e.g., as a fortification or other preparatory protocol 139H).

49. The method of any one of the above Clauses wherein executing the first prepared package 160, 460, 660 in the first secure execution environment 165, 465, 665 comprises:

de-obfuscating the first prepared package 160, 460, 660 in the first secure execution environment 165, 465, 665 and thereafter allowing a compilation (e.g., using a protocol implementation module 159) of a first portion 61B of the digital code 105, 405 so that a compiled second (version or other) portion 61C of the digital code 105, 405 is established in the first secure execution environment 165, 465, 665.

50. A security enhancement system 100 as indicated in any one of the above method Clauses.

51. A security enhancement system 100 pertaining to digital code 105, 405 comprising:

first transistor-based circuitry (e.g., one or more security control modules 154) configured to cause at least some of the digital code 105, 405 to become (one or more components 161 of) a first prepared package 160, 460, 660 by undergoing a first fortification protocol 139A (e.g., comprising an obfuscation protocol 139A or an encryption protocol 139F (or both));

second transistor-based circuitry (e.g., one or more setup modules 153) configured to authorize or otherwise cause a first secure execution environment 165, 465, 665 to be adapted for use with the first prepared package 160, 460, 660 at or via a "first" (set of) apparatuses 106A-B and to be distributed with the first prepared package 160, 460, 660 to a complementary "second" (set of) one or more apparatuses 106A (e.g., near Houston); and third transistor-based circuitry (e.g., one or more invocation modules 151) configured to authorize or otherwise cause at least some of the first prepared package 160, 460, 660 (e.g., comprising one or more instances of precursors 141, of compiled expressions 142, of translations 143, or of other versions, instances or portions 61A-C of the digital code 105 or metadata thereof) to be executed or otherwise used in the first secure execution environment 165, 465, 665 by or at the "second" (set of) one or more apparatuses 106B (e.g., near Guadalajara).

52. The system 100 wherein (at least one instance each of) said first, second, and third transistor-based circuitry are each included in the system 100 but wherein the "second" (set of) one or more apparatuses 106B is not.

53. The system 100 wherein (at least a participating instance of) said first, second, or third transistor-based circuitry is remote from the "second" one or more apparatuses 106B thereby fortified.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

What is claimed is:

1. A security enhancement method pertaining to digital code comprising:
    invoking first circuitry configured to cause at least some of said digital code to become a first prepared package by undergoing a first fortification protocol comprising at least one of an obfuscation protocol or an encryption protocol;
    invoking second transistor-based circuitry configured to authorize and thereby cause a first secure execution environment to be adapted for use with said first prepared package via a first set of one or more computers and to be distributed with said first prepared package to a second set of one or more computers; and
    invoking third transistor-based circuitry configured to authorize and thereby cause at least some of said first prepared package to be executed in said first secure execution environment by said second set of one or more computers wherein said method provides a lower computational cost less than that of homomorphic encryption, wherein said method provides a faster execution speed of at least some of said digital code faster than homomorphic encryption, and wherein said first secure execution environment comprises a parsing protocol effective for de-obfuscation whereby said at least some of said first prepared package is thereafter executed safely in said first secure execution environment without any obfuscation.

2. The method according to claim 1 wherein executing said first prepared package in said first secure execution environment comprises:
    at least one of decrypting or de-obfuscating said first prepared package in said first secure execution environment and thereafter compiling a first portion of said digital code so that a compiled second portion of said digital code is established in said first secure execution environment.

3. The method according to claim 1 wherein said digital code is encrypted, distributed, and decrypted using one or more encryption keys before ever being executed in said first secure execution environment via one or more local protocol implementation modules in said second one or more computers.

4. The method according to claim 1 wherein an entirety of said digital code is temporarily obfuscated before ever being executed in said first secure execution environment and wherein said first secure execution environment comprises a decryption key effective for de-obfuscation whereby said at least some of said first prepared package is thereafter executed safely in said first secure execution environment without any obfuscation.

5. The method according to claim 1 wherein said method provides a faster execution speed of at least some of said digital code more than twice as fast as that of homomorphic encryption and wherein said first secure execution environment comprises a parsing protocol effective for de-obfuscation whereby said at least some of said first prepared package is thereafter executed safely in said first secure execution environment without any obfuscation.

6. The method according to claim 1 wherein a first portion of said digital code to be executed is source code and wherein said first portion is compiled so as to become binary code as a second portion thereof.

7. The method according to claim 1 wherein an encryption key and indexer thereof are both stored in one or more encryption key records and wherein said digital code is obfuscated using one or more parsing protocols before ever being executed in said first secure execution environment.

8. The method according to claim 1 wherein executing said first prepared package in said first secure execution environment comprises:
    decrypting said first prepared package in said first secure execution environment and thereafter allowing a compilation of a first portion of said digital code so that a compiled version of said digital code is thereby established in said first secure execution environment.

9. A security enhancement method pertaining to digital code comprising:
    invoking first transistor-based circuitry configured to cause at least some of said digital code to become a first prepared package by undergoing a first fortification protocol;
    invoking second transistor-based circuitry configured to cause a first secure execution environment to be adapted for use with said first prepared package at or via a first one or more computers and to be distributed with said first prepared package to a second one or more computers; and
    invoking third transistor-based circuitry configured to cause at least some of said first prepared package to be executed in said first secure execution environment by said second one or more computers wherein said method provides a faster execution speed of at least some of said digital code faster than homomorphic encryption and wherein said first secure execution environment comprises a parsing protocol effective for de-obfuscation whereby said at least some of said first prepared package is thereafter executed safely in said first secure execution environment without any obfuscation.

10. The method according to claim 9 wherein a first portion of said digital code to be executed is source code and wherein said first portion is compiled so as to become binary code as a second portion thereof, said method comprising: directly executing said second portion thereof.

11. The method according to claim 9 wherein an encryption key and indexer thereof are both stored in a first shared encryption key record and wherein said at least one expression of said digital code of said first prepared package is executed without any of said digital code having been executed in a main memory of any of said second one or more computers.

12. The method according to claim 9 wherein said digital code is encrypted, distributed, and decrypted using one or more encryption keys before ever being executed in said first secure execution environment in said second one or more computers.

13. The method according to claim 9 wherein an entirety of said digital code is temporarily obfuscated before ever being executed in said first secure execution environment.

14. The method according to claim 9 wherein said first secure execution environment comprises a decryption key effective for de-obfuscation whereby said at least some of said first prepared package is thereafter executed safely in said first secure execution environment without any obfuscation and wherein said method provides a lower computational cost pertaining to executing at least some of said digital code less than half of that of homomorphic encryption.

15. The method according to claim 9 wherein said first secure execution environment comprises a parsing protocol effective for de-obfuscation whereby said at least some of said first prepared package is thereafter executed safely in said first secure execution environment without any obfuscation.

16. The method according to claim 9 wherein executing said first prepared package in said first secure execution environment comprises:
at least one of decrypting or de-obfuscating said first prepared package in said first secure execution environment and thereafter compiling a first portion of said digital code so that a compiled second portion of said digital code is established in said first secure execution environment.

17. The method according to claim 9 wherein executing said first prepared package in said first secure execution environment comprises:
de-obfuscating said first prepared package in said first secure execution environment and thereafter allowing a compilation of a first portion of said digital code so that a compiled second portion of said digital code is established in said first secure execution environment.

18. A computer program product comprising:
one or more tangible, non-transitory storage media; and
machine instructions borne on said one or more tangible, non-transitory storage media which, when running on one or more computer systems, cause said one or more computer systems to perform a method comprising:
invoking first transistor-based circuitry configured to cause at least some of said digital code to become a first prepared package by undergoing a first fortification protocol;
invoking second transistor-based circuitry configured to cause a first secure execution environment to be adapted for use with said first prepared package at or via a first one or more computers and to be distributed with said first prepared package to a second one or more computers; and
invoking third transistor-based circuitry configured to cause at least some of said first prepared package to be executed in said first secure execution environment said second one or more computers wherein said method provides a faster execution speed of at least some of said digital code faster than homomorphic encryption and wherein said first secure execution environment comprises a parsing protocol effective for de-obfuscation whereby said at least some of said first prepared package is thereafter executed safely in said first secure execution environment without any obfuscation.

19. A security enhancement system pertaining to digital code comprising:
first transistor-based circuitry configured to cause at least some of said digital code to become a first prepared package by undergoing a first fortification protocol;
second transistor-based circuitry configured to cause a first secure execution environment to be adapted for use with said first prepared package at or via a first one or more computers and to be distributed with said first prepared package to a second one or more computers; and
third transistor-based circuitry configured to cause at least some of said first prepared package to be executed in said first secure execution environment said second one or more computers wherein a method provides a faster execution speed of at least some of said digital code faster than homomorphic encryption and wherein said first secure execution environment comprises a parsing protocol effective for de-obfuscation whereby said at least some of said first prepared package is thereafter executed safely in said first secure execution environment without any obfuscation.

* * * * *